US012522813B2

(12) United States Patent
Qureshi et al.

(10) Patent No.: US 12,522,813 B2
(45) Date of Patent: Jan. 13, 2026

(54) MANNANASE FOR FORMULATIONS HAVING PH 5-12

(71) Applicant: BASF SE, Ludwigshafen (DE)

(72) Inventors: Asfia Qureshi, San Diego, CA (US); Amanda Rae Logue, San Diego, CA (US); Cindy Hoang, San Diego, CA (US); Katie Kline, San Diego, CA (US); Jesper Nielsen, San Diego, CA (US)

(73) Assignee: BASF SE, Ludwigshafen am Rhein (DE)

( * ) Notice: Subject to any disclaimer, the term of this patent is extended or adjusted under 35 U.S.C. 154(b) by 717 days.

(21) Appl. No.: 17/762,582

(22) PCT Filed: Sep. 22, 2020

(86) PCT No.: PCT/EP2020/076358
§ 371 (c)(1),
(2) Date: Mar. 22, 2022

(87) PCT Pub. No.: WO2021/058452
PCT Pub. Date: Apr. 1, 2021

(65) Prior Publication Data
US 2023/0220308 A1 Jul. 13, 2023

(30) Foreign Application Priority Data
Sep. 23, 2019 (EP) .................................. 19199043

(51) Int. Cl.
C12N 9/24 (2006.01)
C11D 3/00 (2006.01)
C12N 15/52 (2006.01)

(52) U.S. Cl.
CPC .......... C12N 9/2488 (2013.01); C11D 3/0047 (2013.01); C12N 15/52 (2013.01); C11D 2111/12 (2024.01)

(58) Field of Classification Search
CPC .... C12N 9/2488; C12N 15/52; C11D 3/0047; C11D 2111/12
See application file for complete search history.

(56) References Cited

FOREIGN PATENT DOCUMENTS

| EA | 023087 B1 | 4/2016 |
|---|---|---|
| EP | 2404928 A1 | 1/2012 |
| EP | 2404929 A1 | 1/2012 |
| EP | 2404930 A1 | 1/2012 |
| EP | 2409981 A1 | 1/2012 |
| WO | WO-98/13459 A1 | 4/1998 |
| WO | WO-99/09132 A1 | 2/1999 |
| WO | WO-2005/003319 A2 | 1/2005 |
| WO | WO-2009/118375 A2 | 10/2009 |
| WO | WO-2011085747 A1 | 7/2011 |
| WO | WO-2019/081515 A1 | 5/2019 |

OTHER PUBLICATIONS

Uniprot Acc. No. A0A177ZI85 Mannan endo-1,4-beta-mannosidase (Beta-mannanase). Retrieved online from https://www.uniprot.org/uniprotkb/A0A177ZI85/entry (Year: 2016).*
Chauhan, P.S., Puri, N., Sharma, P. et al. Mannanases: microbial sources, production, properties and potential biotechnological applications. Appl Microbiol Biotechnol 93, 1817-1830 (2012). (Year: 2012).*
"SubName: Full=Mannan endo-1,4-beta-mannosidase (Beta-mannanase) (1,4-beta-D-mannan mannanohydrolase) {ECO:0000313:EMBL:OAK67642.1}", Database UniProt [Online], retrieved from EBI accession No. Uniprot: A0A177ZI85, Database accession No. A0A177ZI85, XP002798064, Sep. 7, 2016, 1 page.
Agaisse et al., "Structural and functional analysis of the promoter region involved in full expression of the cryIIIA toxin gene of Bacillus thuringiensis", Molecular Microbiology, vol. 13, Issue 1, Jul. 1994, pp. 97-107.
Amann et al., "Tightly regulated tac promoter vectors useful for the expression of unfused and fused proteins in Escherichia coli", Gene, vol. 69, Issue 2, Sep. 30, 1988, pp. 301-315.
Chen et al., Tracing determinants of dual substrate specificity in glycoside hydrolase family 5, J. Biol. Chem., 287(30):25335-43 (2012).
Da Cruz, Mannan-degrading enzyme system, pp. 233-257, IN: Fungal Enzymes, CRC Press (2013).
De Boer et al., "The tac promoter: a functional hybrid derived from the trp and lac promoters.", Proceedings of the National Academy of Sciences of the United States of America, vol. 80, Issue 1, Jan. 1, 1983, pp. 21-25.
European Search Report for EP Patent Application No. 19199043.1, Issued on Mar. 18, 2020, 4 pages.
Gilbert, et al., "Useful Proteins from Recombinant Bacteria", Scientific American, vol. 242, Issue 4, Apr. 1980, pp. 74-97.
International Search Report and Written Opinion for PCT Patent Application No. PCT/EP2020/076358, Issued on Dec. 16, 2020.
Mccleary, "A simple assay procedure for beta-D-mannanase", Carbohydrate Research, vol. 67, Issue 1, Nov. 1978, pp. 213-221.
Miller, "Use of Dinitrosalicylic Acid Reagent for Determination of Reducing Sugar", Analytical Chemistry, vol. 31, Issue 3, Mar. 1, 1959, pp. 426-428.
Needleman, et al., "A general method applicable to the search for similarities in the amino acid sequence of two proteins?", Journal of Molecular Biology, vol. 48, Issue 3, Mar. 28, 1970, pp. 443-453.
Srivastava et al., Production, properties and applications of endo-[beta]-mannanases, Biotechnology Advances, 35(1):19-19 (2016).
Villa-Komaroff et al., "A bacterial clone synthesizing proinsulin.", Proceedings of the National Academy of Science of the United States of America, vol. 75, Issue 8, Aug. 1, 1978, pp. 3727-3731.
Altmann, et al., "Single proline substitutions in predicted alpha-helices of murine granulocyte-macrophage colony-stimulating factor result in a loss in bioactivity and altered glycosylation", The Journal of Biological Chemistry, vol. 266, Issue 8, Mar. 15, 1991, pp. 5333-5341.

(Continued)

Primary Examiner — Thomas J. Visone
Assistant Examiner — Georgiana C. Reglas
(74) Attorney, Agent, or Firm — ArentFox Schiff LLP

(57) ABSTRACT

A mannanase at least 85% identical to SEQ ID NO: 1, a polynucleotide encoding the mannanase, an expression construct comprising the polynucleotide, and a host cell comprising the polynucleotide or the expression construct.

7 Claims, No Drawings
Specification includes a Sequence Listing.

(56) References Cited

OTHER PUBLICATIONS

Kim, et al., "A highly active endo-β-1,4-mannanase produced by *Cellulosimicrobium* sp. strain HY-13, a hemicellulolytic bacterium in the gut of Eisenia fetida", Enzyme and Microbial Technology, vol. 48, Issue 4-5, Apr. 7, 2011, pp. 365-370.

Kumagai, et al., "Molecular insights into the mechanism of thermal stability of actinomycete mannanase", FEBS Letters, vol. 590, Issue 17, Jul. 22, 2016, pp. 2862-2869.

Marques, et al., "Amino acid patterns around disulfide bonds", International Journal of Molecular Sciences, vol. 11, Issue 11, Nov. 18, 2010, pp. 4673-4686.

"Glycoside hydrolase family 5 protein [Bacillus endophyticus]", Database NCBI Reference Sequence, retrieved from STN Database accession No. 064505014.1, May 13, 2018, 1 Page. URL: https://www.ncbi.nlm.nih.gov/protein/1034540029?sat=47&satkey=85132073.

Broun, et al., "Catalytic Plasticity of Fatty Acid Modification Enzymes Underlying Chemical Diversity of Plant Lipids", Science, vol. 282, Issue 5392, Nov. 13, 1998, pp. 1315-1317.

Seffernick, et al., "Melamine deaminase and atrazine chlorohydrolase: 98 percent identical but functionally different", Journal of bacteriology, vol. 183, Issue 8, Apr. 15, 2001, pp. 2405-2410.

Whisstock, et al., "Prediction of protein function from protein sequence and structure", Quarterly reviews of biophysics, vol. 36, Issue 3, Aug. 2003, pp. 307-340.

Witkowski, et al., "Conversion of a ?-Ketoacyl Synthase to a Malonyl Decarboxylase by Replacement of the Active-Site Cysteine with Glutamine", Biochemistry, vol. 38, Issue 36, Aug. 18, 1999, pp. 11643-11650.

Yampolsky, et al., "The Exchangeability of Amino Acids in Proteins", Genetics, vol. 170, Issue 4, Aug. 1, 2005, pp. 1459-1472.

* cited by examiner

MANNANASE FOR FORMULATIONS HAVING PH 5-12

CROSS-REFERENCE TO RELATED APPLICATIONS

This is the U.S. national phase of International Application No. PCT/EP2020/076358, filed Sep. 22, 2020, which claims priority to European Patent Application No. 19199043.1, filed on Sep. 23, 2019.

INCORPORATION BY REFERENCE OF MATERIAL SUBMITTED ELECTRONICALLY

The Sequence Listing, which is a part of the present disclosure, is submitted concurrently with the specification as a text file. The name of the text file containing the Sequence Listing is "191164_SubSeqListing.txt ", which was created on Sep. 24, 2022 and is 7,464 bytes in size. The subject matter of the Sequence Listing is incorporated herein in its entirety by reference.

The main role of hemicelluloses and galactomannans is to function as structural polysaccharide and/or as reserve energy. Besides amylose and amylopectin which are the most widespread storage polysaccharides in plants, there is a diverse group of mannan-based polysaccharides found in seeds, roots, bulbs and tubers of various plants. These include mannans, galactomannans and glucomannans.

Mannans are polysaccharides with a backbone of $\beta$-1,4-linked D-mannopyranosyl residues. In most cases the mannans are highly insoluble in water. In contrast to unsubstituted mannans, the galactomannans are water soluble. Due to the complex structural composition of the plant cell wall, microorganisms thriving on decaying plant material must possess a number of different enzymes that are able to hydrolyse these highly polymeric and mostly insoluble materials. The two major endo-acting enzymes involved in degradation of hemicelluloses are beta-mannanase and beta-xylanase. In addition, the exo-acting enzymes beta-mannosidase, alpha-galactosidase and beta-glucosidase are needed for complete degradation of galactoglucomannan.

The main enzyme type participating in the degradation of mannan backbones are endo-1,4-beta-mannanases (EC 3.2.1.78), which hydrolyze the internal glycoside bonds in the mannan backbone. Endo-1,4-$\beta$-mannanases (EC 3.2.1.78) are mannan-degrading enzymes which are also called endo-$\beta$-1,4-D-mannanase, $\beta$-mannanase, or mannanase herein. Since endo-1,4-beta-mannanases (EC 3.2.1.78) degrade the mannan-backbone, mannan-degradation includes the degradation of mannans, galactomannans and/or glucomannans.

The use of mannanase enzymes is widespread in food & feed applications, the detergent and the pulp & paper industry:

The use of mannanase enzymes as feed additives has been shown to provide several beneficial effects since for monogastric animals like poultry and swine mannans are largely indigestible feed components that act as antinutritional factors.

In the food industry mannanase enzymes are described for the use in the production of instant coffee where the enzyme reduces the viscosity of the coffee extracts due to hydrolysis of the coffee mannan. Further, mannanases are used to produce specific mannooligomers that are of interest as functional food ingredients such as mannooligomers with a prebiotic functionality. In such applications plant derived mannopolymers are subjected to hydrolysis by mannanases.

Detergent use: mannanases facilitate the removal of food and cosmetic derived stains/soils that often comprise mannan containing additives like stabilizers, emulsifiers and thickeners. In a more specific cleaning application mannanases are applied to remove biofilms from surfaces or tubings that need to be free from microbials like pharmaceutical equipment. In this application mannanases are often used in combination with detergents and other enzymes like carbohydrases and proteases.

Pulp and paper: mannanases are used in the enzyme-aided bleaching of paper pulp. Mannanases are said to complement the action of xylanases.

Mannanases are applied in the process of oil and gas well stimulation by hydraulic fracturing. Mannanases reduce viscosity of a guar solution that is applied in the process.

Mannanases are used in the controlled release of drugs or other material from matrices that are composed of cross-linked galactomannans.

Activity under application conditions is a critical parameter for many industrially applied enzymes, since these enzymes often tend to be insufficiently active under application conditions.

There is a continuous need for enzymes that perform in the harsh environment of detergent formulations. Different classes of enzymes are known to be useful in detergent formulations such as protease, amylase, cellulase, lipase, mannanase, pectate lyase, and nuclease. Mannanases are useful components of washing and/or cleaning formulations since mannanases remove part of hemicellulose comprising stains. Insufficient removal of these types of stains usually resulting in fabric graying.

Mannan-comprising stains herein comprise at least one mannan, at least one galactomannan and/or at least one glucomannan and in one embodiment, further constituents such as cellulose and/or hemicellulose. Further, such stains may comprise proteinaceous material, starch and/or sugars. Galactomannans usually consist of a mannose backbone with galactose side groups. Herein, galactomannans include galactomannans having the following mannose to galactose ratio: fenugreek gum about 1:1, guar gum about 2:1, tara gum about 3:1, locust bean gum or carob gum about 4:1, cassia gum about 5:1, wherein the ratio is mannose:galactose. Galactomannans are often used in food and cosmetic products to increase the viscosity of a liquid product.

Hence, it was the objective to find mannan degrading enzymes catalytically active in formulations having a pH in the range of 5-12, preferably in the range of 6-11, more preferably selected from the ranges of 6-10, 7-9, 7-12, 8-12, 8-10 and 7.5-8.5. Preferably the mannan degrading enzymes show wash performance when provided within a detergent formulation.

In one aspect, the present invention provides a mannanase having mannan degrading activity and/or show wash performance at a pH in the range of 5-12 or 6-11, more preferably a pH in the range of 6-10 or 7-9 or 7-12 or 8-12 or 8-10, and most preferably at a pH in the range of 7.5-8.5. The mannanase is at least 75% identical to SEQ ID NO: 1, preferably at least 75% identical to a sequence according to positions 29-324 of SEQ ID NO: 1.

In one aspect, the invention provides a polynucleotide sequence encoding a mannanase of the invention. The invention provides a method of making a mannanase of the invention, comprising: providing a polynucleotide of the invention, transforming the same into an expression host, cultivating the expression host under suitable conditions which allow expression of a mannanase of the invention, and isolating and purifying a mannanase of the invention.

In one aspect of the invention, the mannanase of the invention is provided within an enzyme preparation that allows to be flexibly formulated into liquid detergent formulations or cleaning formulations with either one type of enzymes or mixtures of enzymes. "Formulated into" means that the enzyme preparation is added to a liquid formulation.

In one aspect, the invention at hand provides a formulation preferably having a pH in the range of 5-12, preferably in the range of 6-11, more preferably in a range selected from 6-10, 7-9, 7-12, 8-12, 8-10 and 7.5-8.5 comprising a mannanase of the invention. Preferably, the formulation is a liquid formulation comprising at least one component selected from surfactants, builders, and hydrotropes is present in amounts effective in maintaining the physical characteristics of the liquid formulation and/or effective in cleaning. In one embodiment, the formulation is a detergent formulation and the mannanase shows wash performance when provided within the detergent formulation.

DETAILED DESCRIPTION OF THE INVENTION

Generally, "enzymes" are catalytically active proteins or polypeptides acting on substrates and converting these into products. This reaction is also be called enzymatic conversion herein which typically takes place at the "active site" of an enzyme. Enzymes exerting enzymatic conversion are enzymatically active or have enzymatic activity. Any polypeptide called "enzyme" herein means polypeptides being catalytically active.

The mannanases according to the invention have mannan degrading activity and are of the enzyme class EC 3.2.1.78. In one embodiment, mannan degrading activity means degradation of at least one galactomannan. Preferably, at least one galactomannan is characterized by the ratio mannose: galactose of about 1:1, about 2:1, about 3:1, about 4:1, and/or 5:1.

Mannan degrading activity or mannanase activity may be tested according to standard test procedures known in the art. For example: a mannanase to be tested may be applied to 4 mm diameter holes punched out in agar plates comprising 0.2% AZCL galactomannan (carob), i.e. substrate for the assay of endo-1,4-beta-D-mannanase. Carob is e.g. available as I-AZGMA from the company Megazyme. Mannan degrading activity may be tested in a liquid assay using carob galactomannan dyed with Remazol Brilliant Blue as described in McCleary, B. V. (1978). Carbohydrate Research, 67(1), 213-221. Another method for testing mannan degrading activity uses detection of reducing sugars when incubated with substrate such as guar gum or locust bean gum—for reference see Miller, G. L. Use of Dinitrosalicylic Acid Reagent for Determination of Reducing Sugars. Analytical Chemistry 1959; 31: 426-428.

Enzymes are polypeptides which are usually identified by polypeptide sequences (also called amino acid sequences herein). Polypeptide sequences are usually identified by a SEQ ID NO. According to the World Intellectual Property Office (WIPO) Standard ST.25 (1998) the amino acids herein are represented using three-letter code with the first letter as a capital or the corresponding one letter.

A polypeptide, in one aspect is encoded by a polynucleotide. The polynucleotide usually is identified by a polynucleotide sequence and by a SEQ ID NO. According to the World Intellectual Property Office (WIPO) Standard ST.25 (1998).

A "parent" polypeptide amino acid sequence is the starting sequence for introduction of mutations (e.g. by introducing one or more amino acid substitutions, insertions, deletions, or a combination thereof) to the sequence, resulting in "variants" of the parent polypeptide amino acid sequences. A parent includes: A wild-type polypeptide amino acid sequence or synthetically generated polypeptide amino acid sequence that is used as starting sequence for introduction of (further) changes.

The parent polypeptide for the mannanase of this invention has a polypeptide sequence according to SEQ ID NO: 1. In one aspect of the invention the parent polypeptide has a sequence according to positions 29-324 of SEQ ID NO: 1.

A "variant polypeptide" refers to an enzyme that differs from its parent in its amino acid sequence.

Variant polypeptide sequences in on embodiment are defined by their "sequence identity" when compared to a parent sequence. An enzyme or polypeptide "at least x % identical to SEQ ID NO:X" means an enzyme or polypeptide having a polypeptide sequence which is x % identical when compared to the polypeptide sequence according to SEQ ID NO:X.

Variant polypeptide sequences, in one embodiment, are defined as being encoded by a specific polynucleotide (sequence). The polynucleotide sequence, in one aspect is provided as a polynucleotide sequence. A polynucleotide "at least y % identical to SEQ ID NO:Y" means a polynucleotide having a polynucleotide sequence which is y % identical when compared to the polynucleotide sequence according to SEQ ID NO:Y.

Sequence identity usually is provided as "% sequence identity" or "% identity". For calculation of sequence identities, in a first step a sequence alignment has to be produced.

According to the invention, the alignment is generated by using the algorithm of Needleman and Wunsch (J. Mol. Biol. (1979) 48, p. 443-453). Preferably, the program "NEEDLE" (The European Molecular Biology Open Software Suite (EMBOSS)) is used for the purposes of the current invention, with using the programs default parameter (polynucleotides: gap open=10.0, gap extend=0.5 and matrix=EDNAFULL; polypeptides: gap open=10.0, gap extend=0.5 and matrix=EBLOSUM62).

After aligning two sequences, in a second step, an identity value is determined from the alignment produced.

Herein, the %-identity is calculated by dividing the number of identical residues by the length of the alignment region which is showing the two aligned sequences over their complete length multiplied with 100: %–identity= (identical residues/length of the alignment region which is showing the two aligned sequences over their complete length)*100.

The mannanase of the invention is at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 1, preferably when compared to the full length amino acid sequence of SEQ ID NO: 1. In one aspect of the invention, the mannanase of the invention is at least 75%, at least 80%, at least 85%, at least 90%, at least 91%, at least 92%, at least 93%, at least 94%, at least 95%, at least 96%, at least 97%, at least 98%, or at least 99% identical to the sequence according to positions 29-324 of SEQ ID NO: 1, preferably when compared to the full length amino acid sequence of positions 29-324 of SEQ ID NO: 1.

The mannanase may further comprise one or more conservative substitutions, meaning that one amino acid is substituted with a similar amino acid. Similar amino acids according to the invention are defined as follows: amino acid A is similar to amino acids S; amino acid D is similar to amino acids E and N; amino acid E is similar to amino acids D, K, and Q; amino acid F is similar to amino acids W and Y; amino acid H is similar to amino acids N and Y; amino acid I is similar to amino acids L, M, and V; amino acid K is similar to amino acids E, Q, and R; amino acid L is similar to amino acids I, M, and V; amino acid M is similar to amino acids I, L, and V; amino acid N is similar to amino acids D, H, and S; amino acid Q is similar to amino acids E, K, and R; amino acid R is similar to amino acids K and Q; amino acid S is similar to amino acids A, N, and T; amino acid T is similar to amino acids S; amino acid V is similar to amino acids I, L, and M; amino acid W is similar to amino acids F and Y; amino acid Y is similar to amino acids F, H, and W.

The mannanase of the invention is a "mature polypeptide" meaning an enzyme in its final form including any post-translational modifications, glycosylation, phosphorylation, truncation, N-terminal modifications, C-terminal modifications, signal sequence deletion. A mature polypeptide can vary depending upon the expression system, vector, promoter, and/or production process. The mature mannanase of the invention preferably is at least 75% identical to the sequence according to positions 29-324 of SEQ ID NO: 1.

A mannanase according to the invention has mannan degrading activity at a pH in the range of 5-12, preferably in the range of 6-11, more preferably in a range selected from 6-10, 7-9, 7-12, 8-12, 8-10 and 7.5-8.5. In one embodiment, a mannanase according to the invention has mannan degrading activity within a detergent formulation having a pH in the range of 5-12, preferably in the range of 6-11, more preferably in a range selected from 6-10, 7-9, 7-12, 8-12, 8-10 and 7.5-8.5.

A mannanase according to the invention has mannan degrading activity at a temperature selected from ≤60° C., ≤40° C., and ≤25° C. Preferably, the temperature is washing or cleaning temperature.

The invention relates to a polynucleotide encoding a mannanase at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 1. In one aspect of the invention, the polynucleotide encodes a mannanase at least 75%, at least 80%, at least 85%, at least 90%, at least 91%, at least 92%, at least 93%, at least 94%, at least 95%, at least 96%, at least 97%, at least 98%, or at least 99% identical to the sequence according to positions 29-324 of SEQ ID NO: 1. The polynucleotide of the invention preferably has a sequence at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 2.

The present invention refers to a method of making the mannanase of the invention herein, comprising: providing a nucleic acid sequence encoding the polypeptide described herein, transforming the nucleic acid sequence into a host cell, cultivating the host cell to produce the mannanase, and optionally isolating the mannanase from the host cell, and optionally purifying the mannanase.

A polynucleotide encoding a polypeptide may be "expressed". The term "expression" or "gene expression" means the transcription of a specific gene or specific genes or specific nucleic acid construct. The term "expression" or "gene expression" in particular means the transcription of a gene or genes or genetic construct into structural RNA (e.g., rRNA, tRNA) or mRNA with or without subsequent translation of the latter into a protein. The process includes transcription of DNA and processing of the resulting mRNA product.

Nucleic acid construct herein means a nucleic acid molecule, either single- or double-stranded which is isolated from a naturally occurring gene or is modified to contain segments of nucleic acids in a manner that would not otherwise exist in nature or which is synthetic, which comprises one or more control sequences. The term "control sequences" means nucleic acid sequences necessary for expression of a polynucleotide encoding a mannanase of the present invention. Each control sequence may be native or foreign to the polynucleotide encoding the variant or native or foreign to each other. Such control sequences include, but are not limited to, a leader, polyadenylation sequence, pro-peptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a variant.

Industrial production of enzymes usually is done by using expression systems. "Expression system" herein means a host microorganism, expression hosts, host cell, production organism, or production strain and each of these terms can be used interchangeably. In one embodiment, the expression host is selected from the group consisting of: a bacterial expression system, a yeast expression system, a fungal expression system, and a synthetic expression system. The expression host includes a wildtype cell or a recombinant cell, preferably it is a recombinant cell. "Wild-type cells" herein means cells prior to a certain modification. The term "recombinant (host) cell" (also called "genetically modified cell" herein) refers to a cell which has been genetically altered, modified or engineered such it that exhibits an altered, modified or different genotype as compared to the wild-type cell which it was derived from. The "recombinant (host) cell" comprises an exogenous polynucleotide encoding a certain protein or enzyme and therefore preferably expresses said protein or enzyme.

In one embodiment, the invention is directed to a recombinant host cell comprising a polynucleotide encoding the mannanase as described herein. The host cell may be any cell useful in the recombinant production of a variant including prokaryotes and eukaryotes.

In yet another embodiment, the present invention is directed to a method of expressing a polynucleotide, comprising the steps of (a) providing a host cell comprising a heterologous nucleic acid construct comprising a polynucleotide encoding the mannanase of the invention by introducing the nucleic acid construct comprising the polynucleotide encoding the mannanase of the invention into the host cell; (b) cultivating the recombinant host cell of step (a) under conditions conductive for the expression of the polynucleotide; and (c) optionally, recovering a protein of interest encoded by the polynucleotide.

Examples of expression hosts include but are not limited to: *Aspergillus niger, Aspergillus oryzae, Hansenula polymorpha, Thermomyces lanuginosus, Fusarium oxysporum, Fusarium heterosporum, Escherichia coli, Bacillus*, preferably *Bacillus subtilis, Bacillus pumilus*, or *Bacillus licheniformis, Pseudomonas*, preferably *Pseudomonas fluorescens, Pichia pastoris* (also known as *Komagataella phaffii*), *Myceliopthora thermophila* (C1), *Themothelomyces thermophi-* lus, *Schizosaccharomyces pombe, Trichoderma*, preferably *Trichoderma reesei* and *Saccharomyces*, preferably *Saccharomyces cerevisiae*. The mannanase of the invention may be produced using host cell originating from the microorganisms listed above.

In one embodiment, the bacterial expression system is selected from an *E. coli*, a *Bacillus*, a *Pseudomonas*, and a *Streptomyces*. In one embodiment, the yeast expression system is selected from a *Candida*, a *Pichia*, a *Saccharomyces*, a *Schizosaccharomyces*. In one embodiment, the fungal expression system is selected from a *Penicillium*, an *Aspergillus*, a *Fusarium*, a *Myceliopthora*, a *Rhizomucor*, a *Rhizopus*, a *Thermomyces*, and a *Trichoderma*.

Preferably, the recombinant host cell of the invention is a Gram-positive bacteria including but not limited to, *Bacillus, Clostridium, Enterococcus, Geobacillus, Lactobacillus, Lactococcus, Oceanobacillus, Staphylococcus, Streptococcus*, and *Streptomyces*. More preferably, the host cell is a *Bacillus* cell, more preferably selected from the group of *Bacillus alkalophius, Bacillus amyloliquefaciens, Bacillus brevis, Bacillus circulans, Bacillus clausii, Bacillus coagulans, Bacillus firmus, Bacillus Jautus, Bacillus lentus, Bacillus* licheniformis, *Bacillus megaterium, Bacillus pumilus, Bacillus stearothermophilus, Bacillus subtilis*, and *Bacillus thuringiensis*. Most preferred, the *Bacillus* cell is selected from *Bacillus* subtilis, *Bacillus pumilus, Bacillus licheniformis*, and *Bacillus lentus*. In one embodiment, the *Bacillus* cell is a *Bacillus subtilis* cell.

The invention provides a fermentation method for producing a fermentation product, comprising the steps of
a) providing a recombinant host cell according to the invention, and
b) cultivating the recombinant host cell under conditions allowing for the expression of polynucleotide encoding a mannanase of the invention.

The term "heterologous" (or exogenous or foreign or recombinant) in the context of polynucleotides and polypeptides is defined herein as:
(a) not native to the host cell; or
(b) native to the host cell but structural modifications, e.g., deletions, substitutions, and/or insertions, are included as a result of manipulation of the DNA of the host cell by recombinant DNA techniques to alter the native sequence.

In one embodiment, the invention is directed to a genetic construct comprising a polynucleotide encoding the mannanase of the invention. "Genetic Construct" or "expression cassette" or "expression construct" as used herein, is a DNA molecule composed of at least one polynucleotide sequence of the invention to be expressed, operably linked to one or more control sequences (at least to a promoter) as described herein. Typically, the expression cassette comprises three elements: a promoter sequence, an open reading frame, and a 3' untranslated region that, in eukaryotes, usually contains a polyadenylation site. Additional regulatory elements include transcriptional as well as translational enhancers. An intron sequence may also be added to the 5' untranslated region (UTR) or in the coding sequence to increase the amount of the mature message that accumulates in the cytosol. The expression cassette is part of a vector or is integrated into the genome of a host cell and replicated together with the genome of its host cell. The expression cassette usually is capable of increasing or decreasing expression.

Examples of suitable promoters for directing transcription of the nucleic acid constructs of the present invention in a bacterial host cell are the promoters obtained from *Bacillus amyloliquefaciens* alpha-amylase gene (amyQ), *Bacillus licheniformis* alpha-amylase gene (amyl), *Bacillus licheniformis* penicillase gene (penP), *Bacillus stearothermophilus* maltogenic amylase gene (amyM), *Bacillus subtilis* levan-sucrase gene (sacB), *Bacillus subtilis* xylA and xylB genes, *Bacillus thurigiensis* cryIIIA gene (Agaisse and Lereclus, 1994, Molecular Biology 13: 97-107), *E. coli* lac operon, *E. coli* trc promoter (Egon et at 1988, Gene 69: 301-315), *Streptomyces coelicolor* agarose gene (dagA), and prokaryotic beta-lactamase gene (Villa-Kamaroff et al 1978, Proc. Natl. Acad. Sci USA 75: 3727-3731), as well as tac promoter (DaBoer et al 1983, Proc. Natl. Acad. Sci USA 80: 21-25. Further useful promoters are described in "Useful proteins from recombinant bacteria" in Gilbert et al 1980, Scientific American 242: 74-94; and in Sambrook, J. et al. 1989, Molecular Cloning: A Laboratory Manual, 2nd Ed., Cold Spring Harbor Laboratory Press, Cold Spring Harbor, N.Y.

The term "vector" as used herein comprises any kind of construct suitable to carry foreign polynucleotide sequences for transfer to another cell, or for stable or transient expression within a given cell. The term "vector" as used herein encompasses any kind of cloning vehicles, such as but not limited to plasmids, phagemids, viral vectors (e.g., phages), bacteriophage, baculoviruses, cosmids, fosmids, artificial chromosomes, or and any other vectors specific for specific hosts of interest. Low copy number or high copy number vectors are also included. Foreign polynucleotide sequences usually comprise a coding sequence which are referred to herein as "gene of interest". The gene of interest may comprise introns and exons, depending on the kind of origin or destination of host cell.

A vector as used herein provides segments for transcription and translation of a foreign polynucleotide upon transformation into a host cell or host cell organelles. Such additional segments include regulatory nucleotide sequences, one or more origins of replication that is required for its maintenance and/or replication in a specific cell type, one or more selectable markers, a polyadenylation signal, a suitable site for the insertion of foreign coding sequences such as a multiple cloning site etc. One example is when a vector is required to be maintained in a bacterial cell as an episomal genetic element (e.g. plasmid or cosmid molecule). Non-limiting examples of suitable origins of replication include the f1-ori and colE1. A vector replicates without integrating into the genome of a host cell, e.g. as a plasmid in a bacterial host cell, or it integrates part or all of its DNA into the genome of the host cell and thus lead to replication and expression of its DNA.

Foreign nucleic acid may be introduced into a vector by means of cloning. Cloning means that by cleavage of the vector (e.g. within the multiple cloning site) and the foreign polynucleotide by suitable means and methods (e.g., restriction enzymes), fitting structures within the individual nucleic acids are usually created that enable the controlled fusion of said foreign nucleic acid and the vector. Once introduced into the vector, the foreign nucleic acid comprising a coding sequence is introduced (transformed, transduced, transfected, etc.) into a host cell or host cell organelles. The cloning vector preferably is suitable for expression of the foreign polynucleotide sequence in the host cell or host cell organelles.

The term "introduction" or "transformation" as referred to herein encompasses the transfer of an exogenous polynucleotide into a host cell, irrespective of the method used for transfer. That is, the term "transformation" as used herein is independent from vector, shuttle system, or host cell, and it not only relates to the polynucleotide transfer method of transformation as known in the art (cf., for example, Sambrook, J. et al. (1989) Molecular Cloning: A Laboratory Manual, 2nd Ed., Cold Spring Harbor Laboratory Press, Cold Spring Harbor, N.Y.), but it encompasses any further kind polynucleotide transfer methods such as, but not limited to, transduction or transfection. Plant tissue capable of subsequent clonal propagation, whether by organogenesis or embryogenesis, may be transformed with a genetic construct and a whole plant regenerated therefrom. The particular tissue chosen will vary depending on the clonal propagation systems available for, and best suited to, the particular species being transformed. In one embodiment of the invention, a vector is used for transformation of a host cell.

The polynucleotide of the invention may be transiently or stably introduced into a host cell, preferably *Bacillus*, and may be maintained non-integrated, for example, as a plasmid. "Stable transformation" means that the transformed cell or cell organelle passes the nucleic acid comprising the foreign coding sequence on to the next generations of the cell or cell organelles. Usually stable transformation is due to integration of nucleic acid comprising a foreign coding sequence into the chromosomes or as an episome (separate piece of nuclear DNA). "Transient transformation" means that the cell or cell organelle once transformed expresses the foreign nucleic acid sequence for a certain time—mostly within one generation. Usually transient transformation is due to nucleic acid comprising a foreign nucleic acid sequence is not integrated into the chromosomes or as an episome. Alternatively, it is integrated into the host genome.

Enzymes are usually produced as a liquid concentrate, frequently derived from a fermentation broth. "Liquid enzyme concentrate" herein means any liquid enzyme-comprising product comprising at least one enzyme. "Liquid" in the context of enzyme concentrate is related to the physical appearance at 20° C. and 101.3 kPa.

The liquid enzyme concentrate may result from dissolution of solid enzyme in solvent. The solvent may be selected from water and an organic solvent. A liquid enzyme concentrate resulting from dissolution of solid enzyme in solvent comprises amounts of enzyme up to the saturation concentration.

Dissolution herein means, that solid compounds are liquified by contact with at least one solvent. Dissolution means complete dissolution of a solid compound until the saturation concentration is achieved in a specified solvent, wherein no phase-separation occurs.

In one aspect of the invention, the enzyme concentrate may be free of water, meaning that no significant amounts of water are present. Non-significant amounts of water herein means, that the enzyme concentrate comprises less than 25%, less than 20%, less than 15%, less than 10%, less than 7%, less than 5%, less than 4%, less than 3%, less than 2% by weight water, all relative to the total weight of the enzyme concentrate, or no water. In one embodiment, enzyme concentrate free of water free of water means that the enzyme concentrate does not comprise significant amounts of water but does comprise organic solvents in amounts of about 10% to 90% by weight, 20% to 85% by weight, 30-80% by weight, 40% to 75% by weight, 50% to 70% by weight, all relative to the total weight of the enzyme concentrate.

Liquid enzyme concentrates comprising water may be called "aqueous enzyme concentrates". In one embodiment, aqueous enzyme concentrates are enzyme-comprising solutions, wherein solid enzyme product is dissolved in water. In one embodiment "aqueous enzyme concentrate" means enzyme-comprising products resulting from enzyme production by fermentation.

Fermentation means the process of cultivating recombinant cells which express the desired enzyme in a suitable nutrient medium allowing the recombinant host cells to grow and express the desired protein. At the end of the fermentation, fermentation broth usually is collected and further processed, wherein the fermentation broth comprises a liquid fraction and a solid fraction. Depending on whether the enzyme has been secreted into the liquid fraction or not, the desired protein or enzyme is recovered from the liquid fraction of the fermentation broth or from cell lysates. Recovery of the desired enzyme uses methods known to those skilled in the art. Suitable methods for recovery of proteins or enzymes from fermentation broth include but are not limited to collection, centrifugation, filtration, extraction, and precipitation.

Liquid enzyme concentrates comprise amounts of enzyme in the range of 0.1% to 40% by weight, or 0.5% to 30% by weight, or 1% to 25% by weight, or 3% to 25% by weight, or 5% to 25% by weight, all relative to the total weight of the enzyme concentrate. In one embodiment, liquid enzyme concentrates are resulting from fermentation and are aqueous.

Aqueous enzyme concentrates resulting from fermentation comprise water in amounts of more than about 50% by weight, more than about 60% by weight, more than about 70% by weight, or more than about 80% by weight, all relative to the total weight of the enzyme concentrate. Aqueous enzyme concentrates resulting from fermentation, in one embodiment comprise water in amounts in the range of about 50% to 80% by weight, or about 60% to 70% by weight, all relative to the total weight of the enzyme concentrate. Aqueous enzyme concentrates which result from fermentation, may comprise residual components such as salts originating from the fermentation medium, cell debris originating from the production host cells, metabolites produced by the production host cells during fermentation. In one embodiment, residual components are comprised in liquid enzyme concentrates in amounts less than 30% by weight, less than 20% by weight less, than 10% by weight, or less than 5% by weight, all relative to the total weight of the aqueous enzyme concentrate.

Enzymes tend to lose enzymatic activity if remaining in an aqueous environment and so it is conventional practice to convert it to an anhydrous form: aqueous concentrates may be lyophilized or spray-dried e.g. in the presence of a carrier material to form aggregates. Usually, solid enzyme products need to be "dissolved" prior to use. To stabilize enzymes in liquid products enzyme inhibitors are usually employed, preferably reversible enzyme inhibitors, to inhibit enzyme activity temporarily until the enzyme inhibitor is released.

An enzyme preparation of the invention is preferably liquid. "Liquid" in the context of enzyme preparation is related to the physical appearance at 20° C. and 101.3 kPa.

The enzyme preparation of the invention comprises a liquid enzyme concentrate comprising at least one mannanase of the invention. An enzyme preparation of the invention comprises only components effective in stabilizing the enzyme preparation or the enzyme comprised therein, e.g. selected from at least one enzyme stabilizer, at least one compound stabilizing the liquid enzyme preparation as such, and at least one solvent.

In one aspect, the invention provides a liquid enzyme preparation comprising a mannanase at least 75% identical to SEQ ID NO: 1, preferably a mannanase at least 75% identical to a sequence according to positions 29-324 of SEQ ID NO: 1, at least one compound stabilizing the liquid enzyme preparation as such, at least one solvent, and optionally at least one enzyme stabilizer.

The liquid enzyme preparation of the invention is preferably free from surfactants. Free from surfactants means, that less than about 10% by weight, less than about 7% by weight, less than about 5% by weight, less than about 3% by weight, less than about 2% by weight, or less than about 1% by weight surfactants are comprised in the liquid enzyme preparation relative to the total weight of the liquid enzyme preparation.

The liquid enzyme preparation of the invention is preferably free from complexing agents. Free from complexing agents means, that less than about 10% by weight, less than about 7% by weight, less than about 5% by weight, less than about 3% by weight, less than about 2% by weight, or less than about 1% by weight complexing agents, preferably amino carboxylates, are comprised in the liquid enzyme preparation relative to the total weight of the liquid enzyme preparation.

In one embodiment, the liquid enzyme preparation of the invention is free from surfactants and free from complexing agents.

Compounds Stabilizing the Liquid Enzyme Preparation as Such

Compounds stabilizing the liquid enzyme preparation as such means any compound except enzyme stabilizers needed to establish storage stability of a liquid preparation in amounts effective to ensure the storage stability.

Storage stability in the context of liquid preparations to those skilled in the art usually includes aspects of appearance of the product and uniformity of dosage.

Appearance of the product is influenced by the pH of the product and by the presence of compounds such as preservatives, antioxidants, viscosity modifiers, emulsifiers etc.

Uniformity of dosage is usually related to the homogeneity of a product.

Inventive enzyme preparations are be alkaline or exhibit a neutral or slightly acidic pH value. The enzyme preparation has a pH in the range of 5-12, preferably in the range of 6-11, more preferably in a range selected from 6-10, 7-9, 7-12, 8-12, 8-10 and 7.5-8.5.

In one embodiment, the liquid enzyme preparation of the invention comprises at least one preservative. Preservatives are added in amounts effective in preventing microbial contamination of the liquid enzyme preparation, preferably the aqueous enzyme preparation.

Non-limiting examples of suitable preservatives include (quaternary) ammonium compounds, isothiazolinones, organic acids, and formaldehyde releasing agents. Non-limiting examples of suitable (quaternary) ammonium compounds include benzalkonium chlorides, polyhexamethylene biguanide (PHMB), Didecyldimethylammonium chloride (DDAC), and N-(3-aminopropyl)N-dodecylpropane-1,3-diamine (Diamine). Non-limiting examples of suitable isothiazolinones include 1,2-benzisothiazolin-3-one (BIT), 2-methyl-2H-isothiazol-3-one (MIT), 5-chloro-2-methyl-2H-isothiazol-3-one (CIT), 2-octyl-2H-isothiazol-3-one (CIT), and 2-butyl-benzo[d]isothiazol-3-one (BBIT). Non-limiting examples of suitable organic acids include benzoic acid, sorbic acid, L(+)-lactic acid, formic acid, and salicylic acid. Non-limiting examples of suitable formaldehyde releasing agent include N,N'-methylenebismorpholine (MBM), 2,2',2"-(hexahydro-1,3,5-triazine-1,3,5-triyl)triethanol (HHT), (ethylenedioxy)dimethanol, .alpha.,.alpha.',.alpha."-trimethyl-1,3,5-triazine-1,3,5(2H,4H,6H)-triethanol (HPT), 3,3'-methylenebis[5-methyloxazolidine] (MBO), and cis-1-(3-chloroallyl)-3,5,7-triaza-1-azoniaadamantane chloride (CTAC).

Further useful preservatives include iodopropynyl butylcarbamate (IPBC), halogen releasing compounds such as dichloro-dimethyl-hydantoine (DCDMH), bromo-chloro-dimethyl-hydantoine (BCDMH), and dibromo-dimethyl-hydantoine (DBDMH); bromo-nitro compounds such as Bronopol (2-bromo-2-nitropropane-1,3-diol), 2,2-dibromo-2-cyanoacetamide (DBNPA); aldehydes such as glutaraldehyde; phenoxyethanol; Biphenyl-2-ol; and zinc or sodium pyrithione.

The liquid enzyme preparation of the invention preferably comprises at least one preservative selected from the group consisting of 2-phenoxyethanol, glutaraldehyde, 2-bromo-2-nitropropane-1,3-diol, and formic acid in acid form or as its salt, and 4,4'-dichloro 2-hydroxydiphenylether. Usually, the liquid enzyme preparation of the invention comprises at least one preservative in amounts ranging from 2 ppm to 5% by weight relative to the total weight of the liquid enzyme preparation. More preferably, the liquid enzyme preparation is free from preservatives, meaning that preservatives are comprised in amounts less than 1 ppm.

Solvents

In one embodiment, the inventive enzyme preparation is aqueous, comprising water in amounts in the range of 5% to 95% by weight, in the range of 5% to 30% by weight, in the range of 5% to 25% by weight, in the range of 30% to 80% by weight, or in the range of 20% to 70% by weight, all relative to the total weight of the enzyme preparation.

In one embodiment, the enzyme preparation of the invention comprises at least one organic solvent selected from ethanol, n-propanol, iso-propanol, n-butanol, iso-butanol, sec.-butanol, ethylene glycol, propylene glycol, 1,3-propane diol, butane diol, glycerol, diglycol, propyl diglycol, butyl diglycol, hexylene glycol, ethylene glycol methyl ether, ethylene glycol ethyl ether, ethylene glycol propyl ether, and phenoxyethanol, preferred are ethanol, isopropanol or propylene glycol. Further, the enzyme preparation of the invention may comprise at least one organic solvent selected from compounds such as 2-butoxyethanol, isopropyl alcohol, and d-limonene.

In a preferred embodiment, the enzyme preparation of the invention, comprises at least one water miscible organic solvent. Water miscibility in this context means the property of the organic solvent to mix in all proportions in water, forming a homogeneous solution. Preferably, at least one water miscible solvent is selected from ethanol, isopropanol or 1,2-propylene glycol.

In one embodiment, the enzyme preparation comprises
 (a) amounts of water in the range of about 20% to 50% and
 (b) at least one organic solvent in amounts in the range of 30% to 60% by weight, or in amounts in the range of 45% to 55% by weight, all relative to the total weight of the enzyme preparation.

In one embodiment, the enzyme preparation comprises organic solvents in amounts in the range of 0% to 20% by weight relative to the total weight of the enzyme preparation. Preferably, the enzyme preparation comprises amounts of water in the range of about 30% to 80% by weight and at least one organic solvent in amounts of less than 10% by weight, less than 5% by weight, or less than 1% by weight, all relative to the total weight of the enzyme preparation.

In one embodiment, the enzyme preparation comprises water in amounts in the range of 5% to 15% by weight and no significant amounts of organic solvent, for example 1% by weight or less, all relative to the total weight of the enzyme preparation.

Enzyme Stabilizer

Stabilization of an enzyme relates to stability in the course of time (e.g. storage stability), thermal stability, pH stability, and chemical stability. The term "enzyme stability" herein preferably relates to the retention of enzymatic activity as a function of time e.g. during storage or operation. Enzyme stabilizers stabilize an enzyme in liquid, preferably aqueous environment, meaning that it reduced or avoids loss of enzymatic activity in the course of time.

In one embodiment, at least one enzyme, preferably at least one mannanase of the invention, is stabilized by the presence of water-soluble sources of calcium and/or magnesium ions within the enzyme preparation. In one embodiment, at least one enzyme stabilizer is selected from polyols or water-soluble salts.

Polyols include polyols containing from 2 to 6 hydroxyl groups. Suitable examples include glycol, 1,2-propane diol, 1,2-butane diol, 1,2 pentane diol, ethylene glycol, hexylene glycol, glycerol, sorbitol, mannitol, erythriol, glucose, fructose, and lactose.

Water-soluble salts in one embodiment are selected from salts like NaCl or KCl, and alkali salts of lactic acid and formic acid.

In an embodiment of the invention, at least one water-soluble salts is selected from water-soluble sources of zinc (II), calcium (II) and/or magnesium (II) ions in the finished compositions that provide such ions to the enzymes, as well as other metal ions (e.g. barium (II), scandium (II), iron (II), manganese (II), aluminum (III), Tin (II), cobalt (II), copper (II), Nickel (II), and oxovanadium (IV)). Preferably, the water-soluble salt is selected from $CaCl_2$ and $MgCl_2$.

In one aspect of the invention, the enzyme preparation further comprises a protease, preferably a serine protease (EC 3.4.21), more preferably a subtilisin EC 3.4.21.62; and/or a lipase, preferable a triacylglycerol lipase (EC 3.1.1.3), more preferably a *Thermomyces lanuginose* lipase. An enzyme stabilizer, in this context may be selected from boron-containing compounds, polyols, peptide aldehydes, other stabilizers, and mixtures thereof.

Boron-containing compounds are selected from boric acid or its derivatives and from boronic acid or its derivatives such as aryl boronic acids or its derivatives, from salts thereof, and from mixtures thereof. Boric acid herein is also called orthoboric acid.

In one embodiment, at least one boron-containing compound is selected from the group consisting of aryl boronic acids and its derivatives. In one embodiment, boron-containing compound is selected from the group consisting of benzene boronic acid (BBA) which is also called phenyl boronic acid (PBA), derivatives thereof, and mixtures thereof.

In one embodiment phenyl-boronic acid derivatives are selected from the group consisting of 4-formyl phenyl boronic acid (4-FPBA), 4-carboxy phenyl boronic acid (4-CPBA), 4-(hydroxymethyl) phenyl boronic acid (4-HMPBA), and p-tolylboronic acid (p-TBA).

Other suitable derivatives include: 2-thienyl boronic acid, 3-thienyl boronic acid, (2-acetamidophenyl) boronic acid, 2-benzofuranyl boronic acid, 1-naphthyl boronic acid, 2-naphthyl boronic acid, 2-FPBA, 3-FBPA, 1-thianthrenyl boronic acid, 4-dibenzofuran boronic acid, 5-methyl-2-thienyl boronic acid, 1-benzothiophene-2 boronic acid, 2-furanyl boronic acid, 3-furanyl boronic acid, 4,4 biphenyl-diboronic acid, 6-hydroxy-2-naphthaleneboronic acid, 4-(methylthio) phenyl boronic acid, 4-(trimethylsilyl) phenyl boronic acid, 3-bromothiophene boronic acid, 4-methylthiophene boronic acid, 2-naphthyl boronic acid, 5-bromothiophene boronic acid, 5-chlorothiophene boronic acid, dimethylthiophene boronic acid, 2-bromophenyl boronic acid, 3-chlorophenyl boronic acid, 3-methoxy-2-thiophene boronic acid, p-methyl-phenylethyl boronic acid, 2-thianthrenyl boronic acid, di-benzothiophene boronic acid, 9-anthracene boronic acid, 3,5 dichlorophenyl boronic, acid, diphenyl boronic acid anhydride, o-chlorophenyl boronic acid, p-chlorophenyl boronic acid, m-bromophenyl boronic acid, p-bromophenyl boronic acid, p-fluorophenyl boronic acid, octyl boronic acid, 1,3,5 trimethylphenyl boronic acid, 3-chloro-4-fluorophenyl boronic acid, 3-aminophenyl boronic acid, 3,5-bis-(trifluoromethyl) phenyl boronic acid, 2,4 dichlorophenyl boronic acid, 4-methoxyphenyl boronic acid, and mixtures thereof.

In one embodiment, at least one enzyme stabilizer is selected from peptide aldehydes. Peptide aldehydes are selected from di-, tri- or tetrapeptide aldehydes and aldehyde analogues (either of the form B1-BO—R wherein, R is H, $CH_3$, $CX_3$, $CHX_2$, or $CH_2X$ (X=halogen), BO is a single amino acid residue (in one embodiment with an optionally substituted aliphatic or aromatic side chain); and B1 consists of one or more amino acid residues (in one embodiment one, two or three), optionally comprising an N-terminal protection group, or as described in WO 09/118375 and WO 98/13459, or a protease inhibitor of the protein type such as RASI, BASI, WASI (bifunctional alpha-amylase/subtilisin inhibitors of rice, barley and wheat) or $Cl_2$ or SSI. Preferably, the peptide aldehyde is a tripeptide aldehyde.

Mannanase Application

In one aspect, the invention relates to a formulation preferably having a pH in the range of 5-12 comprising at least one mannanase at least 75% identical to SEQ ID NO: 1, preferably comprising at least one mannanase at least 75% identical to positions 29-324 of SEQ ID NO: 1.

The invention in one aspect relates to the use of the liquid enzyme preparation of the invention to be formulated into detergent formulations such as I&I and homecare formulations for laundry and hard surface cleaning, wherein components (a) and (b) are mixed in no specified order in one or more steps with one or more detergent components.

In one embodiment, the formulation has a pH in the range of 6-11, more preferably in a range selected from 6-10, 7-9, 7-12, 8-12, 8-10 and 7.5-8.5. In one embodiment, the formulation is a detergent formulation, preferably a liquid detergent formulation.

A detergent formulation according to the invention comprises one or more detergent component(s). The component(s) chosen depend on the desired washing or cleaning application and/or physical form of the detergent formulation.

The term "detergent component" is defined herein to mean any types of ingredient, which is suitable for detergent formulation, such as surfactants, building agents, polymers, bleaching systems. Any component(s) known in the art acknowledging their known characteristics are suitable detergent component(s) according to the invention. Detergent components in one embodiment means components which provide washing or cleaning performance, or which effectively aid the processing (maintain physical characteristics during processing, storage and use; e.g. rheology modifiers, hydrotropes, desiccants) when present in effective amounts.

Usually, a detergent formulation is a complex formulation of more than two detergent components.

Detergent components may have more than one function in the final application of a detergent formulation, therefore any detergent component mentioned in the context of a specific function herein, may also have another function in the final application of a detergent formulation. The function of a specific detergent component in the final application of a detergent formulation usually depends on its amount within the detergent formulation, i.e. the effective amount of a detergent component.

The term "effective amount" includes amounts of individual components to provide effective stain removal and effective cleaning conditions (e.g. pH, quantity of foaming), amounts of certain components to effectively provide optical benefits (e.g. optical brightening, dye transfer inhibition), and amounts of certain components to effectively aid the processing (maintain physical characteristics during processing, storage and use; e.g. rheology modifiers, hydrotropes, desiccants).

In one embodiment, the detergent formulation according to the invention is a formulation of more than two detergent components, wherein at least one component is effective in stain-removal, at least one component is effective in providing the optimal cleaning conditions, and at least one component is effective in maintaining the physical characteristics of the detergent. Individual detergent components and usage in detergent formulation are known to those skilled in the art. Suitable detergent components comprise inter alia surfactants, builders, polymers, alkaline, bleaching systems, fluorescent whitening agents, suds suppressors and stabilizers, hydrotropes, and corrosion inhibitors. Further examples are described e.g. in "complete Technology Book on Detergents with Formulations (Detergent Cake, Dishwashing Detergents, Liquid & Paste Detergents, Enzyme Detergents, Cleaning Powder & Spray Dried Washing Powder)", Engineers India Research Institute (EIRI), 6th edition (2015). Another reference book for those skilled in the art may be "Detergent Formulations Encyclopedia", Solverchem Publications, 2016.

Detergent components vary in type and/or amount in a detergent formulation depending on the desired application such as laundering white textiles, colored textiles, and wool. The component(s) chosen further depend on physical form of a detergent formulation (liquid, solid, gel, provided in pouches or as a tablet, etc.). The component(s) chosen e.g. for laundering formulations further depend on regional conventions which themselves are related to aspects like washing temperatures used, mechanics of laundry machine (vertical vs. horizontal axis machines), water consumption per wash cycle etc. and geographical characteristics like average hardness of water.

For example: A low detergent concentration system includes laundering formulations where less than about 800 ppm of detergent components are present in the wash water. A medium detergent concentration includes laundering formulations where between about 800 ppm and about 2,000 ppm of detergent components are present in the wash water. A high detergent concentration includes laundering formulations where more than about 2,000 ppm of detergent components are present in the wash water.

The numeric ranges recited for the individual detergent components provide amounts comprised in detergent formulations. Such ranges have to be understood to be inclusive of the numbers defining the range and include each integer within the defined range.

If not described otherwise, "% by weight" or "% w/w" is meant to be related to total detergent formulation. In this case "% by weight" or "% w/w" is calculated as follows: concentration of a substance as the weight of that substance divided by the total weight of the formulation, multiplied by 100.

In one embodiment, the detergent formulation according to the invention comprises one or more surfactant(s). "Surfactant" (synonymously used herein with "surface active agent") means an organic chemical that, when added to a liquid, changes the properties of that liquid at an interface. According to its ionic charge, a surfactant is called nonionic, anionic, cationic, or amphoteric.

Non-limiting examples of surfactants are disclosed McCutcheon's 2016 Detergents and Emulsifiers, and McCutcheon's 2016 Functional Materials, both North American and International Edition, MC Publishing Co, 2016 edition. Further useful examples are disclosed in earlier editions of the same publications which are known to those skilled in the art.

In one embodiment, the detergent according to the invention comprises a total amount of anionic surfactant which in the range of 1% to 30% by weight, in the range of 3% to 25% by weight, in the range of 5% to 20% by weight, or in the range of 8% to 15% by weight, all relative to the total weight of the detergent formulation. In one embodiment, the detergent formulation of the invention comprises a total amount of anionic surfactant of about 11% by weight relative to the total weight of the detergent formulation.

In one embodiment, the detergent formulation according to the invention comprises at least one anionic surfactant selected from compounds of general formula (I):

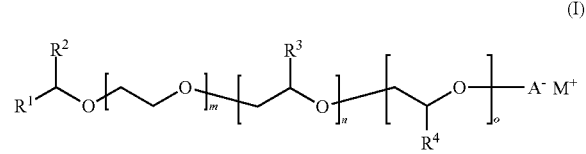

The variables in general formula (I) are defined as follows:

$R^1$ is selected from $C_1$-$C_2$-alkyl (such as 1-, 2-, 3-, 4-$C_1$-$C_2$-alkyl) and $C_2$-$C_2$-alkenyl, wherein alkyl and/or alkenyl are linear or branched, and wherein 2-, 3-, or 4-alkyl; examples are n-$C_7H_{15}$, n-$C_9H_{11}$, n-$C_{11}H_{23}$, n-$C_{13}H_{27}$, n-$C_{15}H_{31}$, n-$C_{17}H_{35}$, i-$C_9H_{19}$, i-$C_{12}H_{25}$.

$R^2$ is selected from H, $C_1$-$C_{20}$-alkyl and $C_2$-$C_{20}$-alkenyl, wherein alkyl and/or alkenyl are linear or branched.

$R^3$ and $R^4$, each independently selected from $C_1$-$C_{16}$-alkyl, wherein alkyl is linear or branched; examples are methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, isodecyl.

$A^-$ is selected from $-RCOO^-$, $-SO_3^-$ and $RSO_3^-$, wherein R is selected from linear or branched $C_1$-$C_8$-alkyl, and $C_1$-$C_4$ hydroxyalkyl, wherein alkyl is. Compounds might be called (fatty) alco-hol/alkyl (ethoxy/ether) sulfates [(F)A(E)S] when $A^-$ is $SO_3^-$, (fatty) alcohol/alkyl (ethoxy/ether) carboxylate [(F)A(E)C] when $A^-$ is $-RCOO^-$.

M is selected from H and salt forming cations. Salt forming cations may be monovalent or multivalent; hence $M^+$ equals $1/v$ $M^{v+}$. Examples include but are not limited to sodium, potassium, magnesium, calcium, ammonium, and the ammonium salt of mono-, di, and triethanolamine. The integers of the general formula (I) are defined as follows:

m is in the range of zero to 200, preferably 1-80, more preferably 3-20; n and o, each independently in the range of zero to 100; n preferably is in the range of 1 to 10, more preferably 1 to 6; o preferably is in the range of 1 to 50, more preferably 4 to 25. The sum of m, n and o is at least one, preferably the sum of m, n and o is in the range of 5 to 100, more preferably in the range of from 9 to 50.

Anionic surfactants of the general formula (I) may be of any structure, block copolymers or random copolymers.

Further suitable anionic surfactants include salts ($M^+$) of $C_{12}$-$C_{18}$ sulfo fatty acid alkyl esters (such as $C_{12}$-$C_{18}$ sulfo fatty acid methyl esters), $C_{10}$-$C_{18}$-alkylarylsulfonic acids (such as n-$C_{10}$-$C_{18}$-alkylbenzene sulfonic acids) and $C_{10}$-$C_{18}$ alkyl alkoxy carboxylates.

$M^+$ in all cases is selected from salt forming cations. Salt forming cations may be monovalent or multivalent; hence $M^+$ equals $1/v\ M^{v+}$. Examples include but are not limited to sodium, potassium, magnesium, calcium, ammonium, and the ammonium salt of mono-, di, and triethanolamine.

In one embodiment, the detergent formulation comprises at least two anionic surfactants, selected from compounds of general formula (I), wherein one of said anionic surfactants is characterized in $R^1$ being $C_{11}$, $R^2$ being H, m being 2, n and o=0, $A^-$ being $SO_3^-$, $M^+$ being $Na^+$ and the other surfactant is characterized in $R^1$ being $C_{13}$, $R^2$ being H, m being 2, n and o=0, $A^-$ being $SO_3^-$, $M^+$ being $Na^+$.

In one embodiment, the detergent formulation comprises at least one anionic surfactant selected from compounds of general formula (II):

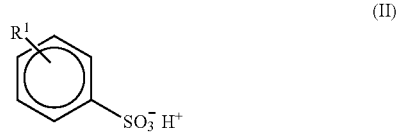

(II)

wherein $R^1$ in formula (II) is $C_{10}$-$C_{13}$ alkyl. In one embodiment, the detergent formulation comprises at least two anionic surfactants, selected from compounds of general formula (II), wherein one of said anionic surfactants is characterized in $R^1$ being $C_{10}$, and the other surfactant is characterized in $R^1$ being $C_{13}$. Compounds like this are also called LAS (linear alkylbenzene sulfonates) herein.

The detergent formulation of the invention comprises a total amount of non-ionic surfactants in the range of about 1% to about 15% by weight, in the range of about 3% to about 12% by weight, or in the range of about 4% to about 8% by weight, all relative to the total weight of the detergent formulation. In one embodiment, the detergent formulation of the invention comprises a total amount of non-ionic surfactants of about 5.5% by weight relative to the total weight of the detergent formulation.

In one embodiment, the detergent formulation according to the invention comprises at least one non-ionic surfactant according to general formula (III):

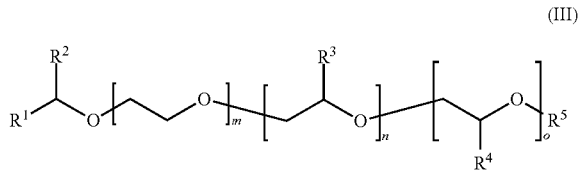

(III)

The variables of the general formula (III) are defined as follows:

$R^1$ is selected from $C_1$-$C_{23}$ alkyl and $C_2$-$C_{23}$ alkenyl, wherein alkyl and/or alkenyl are linear or branched; examples are n-$C_7H_{15}$, n-$C_9H_{19}$, n-$C^{11}H_{23}$, n-$C_{13}H_{27}$, n-$C_{15}H_{31}$, n-$C_{17}H_{35}$, i-$C_9H_{19}$, i-$C_{12}H_{25}$.

$R^2$ is selected from H, $C_1$-$C_{20}$ alkyl and $C_2$-$C_{20}$ alkenyl, wherein alkyl and/or alkenyl are linear or branched.

$R^3$ and $R^4$, each independently selected from $C_1$-$C_{16}$ alkyl, wherein alkyl is linear or branched; examples are methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, isodecyl.

$R^5$ is selected from H and $C_1$-$C_{18}$ alkyl, wherein alkyl is linear or branched.

The integers of the general formula (III) are defined as follows:

m is in the range of zero to 200, preferably 1-80, more preferably 3-20; n and o, each independently in the range of zero to 100; n preferably is in the range of 1 to 10, more preferably 1 to 6; o preferably is in the range of 1 to 50, more preferably 4 to 25. The sum of m, n and o is at least one, preferably the sum of m, n and o is in the range of 5 to 100, more preferably in the range of from 9 to 50.

The non-ionic surfactants of the general formula (III) may be of any structure, is it block or random structure, and is not limited to the displayed sequence of formula (III).

Compounds according to formula (III) are also called alkyl polyethyleneglycol ether (AEO) herein.

In one embodiment, the detergent formulation comprises at least one non-ionic surfactant selected from general formula (III), wherein m is in the range of 3 to 11, preferably not more than 7; n and o is 0, $R^1$ is $C_{12}$-$C_{14}$, $R^5$ is H. In one embodiment, the detergent formulation comprises at least two non-ionic surfactants, selected from compounds of general formula (III), wherein one of said non-ionic surfactants is characterized in $R^1$ being $C_{12}$, $R^5$ being H, m is 7, n and o=0, and the other surfactant is characterized in $R^1$ being $C_{14}$, $R^5$ being H, m being 7, n and o=0.

The detergent formulation according to the invention, in one embodiment, comprises one or more compounds selected from complexing agents (chelating agents, sequestrating agents), precipitating agents, and ion exchange compounds which form water-soluble complexes with calcium and magnesium. Such compounds are also called "builders" or "building agents" herein, without meaning to limit such compounds to this function in the final application of a detergent formulation. In one embodiment, the detergent formulation of the invention comprises at least one builder selected from non-phosphate based builders such as sodium gluconate, citrate(s), silicate(s), carbonate(s), phosphonate(s), amino carboxylate(s), polycarboxylate(s), polysulfonate(s), and polyphosphonate(s).

In one embodiment, the detergent formulation of the invention comprises at least one "citrate" selected from the mono- and the dialkali metal salts and in particular the mono- and preferably the trisodium salt of citric acid, ammonium or substituted ammonium salts of citric acid as well as citric acid as such. Citrate can be used as the anhydrous compound or as the hydrate, for example as sodium citrate dihydrate. The citrate is comprised in a total amount in the range of 0% to about 20% by weight, in the range of about 0.5% to about 10% by weight, or in the range of 1-5% by weight, all relative to the total weight of the detergent formulation. In one embodiment, the detergent formulation of the invention comprises a total amount of citrate in the range of about 1-3% relative to the total weight of the detergent formulation.

The detergent formulation of the invention may comprise one or more hydrotropes. In one embodiment, the detergent formulation of the invention comprises one or more hydrotropes selected from organic solvents such as ethanol, isopropanol, ethylene glycol, 1,2-propylene glycol, and further organic solvents known in the art that are water-miscible under normal conditions without limitation. In one embodiment, the detergent formulation of the invention comprises 1,2-propylene glycol in a total amount in the range of 5-10% by weight, preferably of about 6% by weight, all relative to the total weight of the detergent formulation.

In one embodiment, the detergent formulation of the invention does not comprise any further enzyme besides the mannanase according to the invention.

In one embodiment, the detergent formulation of the invention comprises at least one further enzyme besides the mannanase of the invention, selected from proteases, amylases, lipases, cellulases, mannanases and any other enzymes known in the art to be useful in detergent formulations.

At least one enzyme which is additionally to the mannanase comprised in the detergent formulation of the invention may itself be stabilized by an enzyme stabilizer. At least one enzyme stabilizer is selected from boron-comprising compounds such as boric acid or its derivatives and boronic acid or its derivatives, from salts thereof, and from mixtures thereof, all as disclosed herein. At least one enzyme stabilizer may be selected from peptide aldehydes as disclosed herein.

In one embodiment, at least one enzyme stabilizer is selected from polyols comprising from 2 to 6 hydroxyl groups to stabilize protease. Suitable examples include glycol, 1,2-propane diol, 1,2-butane diol, 1,2 pentane diol, ethylene glycol, hexylene glycol, glycerol, sorbitol, mannitol, erythriol, glucose, fructose, and lactose.

In one embodiment, the detergent formulation of the invention is a laundering detergent.

The term "laundering" relates to both household laundering and industrial laundering and means the process of treating textiles with a solution comprising a detergent formulation of the present invention. In one embodiment, the laundering process may be carried out by using technical devices such as a household or an industrial washing machine. A washing machine is also called laundry machine herein. Alternatively, the laundering process may be done by hand.

The term "textile" means any textile material including yarns (thread made of natural or synthetic fibers used for knitting or weaving), yarn intermediates, fibers, non-woven materials, natural materials, synthetic materials, as well as fabrics (a textile made by weaving, knitting or felting fibers) made of these materials such as garments (any article of clothing made of textile), cloths and other articles.

The term "fibers" includes natural fibers, synthetic fibers, and mixtures thereof. Examples of natural fibers are of plant (such as flax, jute and cotton) or animal origin, comprising proteins like collagen, keratin and fibroin (e.g. silk, sheep wool, angora, mohair, cashmere). Examples for fibers of synthetic origin are polyurethane fibers such as Spandex® or Lycra®, polyester fibers, polyolefins such as elastofin, or polyamide fibers such as nylon. Fibers means single fibers or parts of textiles such as knitwear, wovens, or nonwovens.

The invention relates to a method to provide a liquid mannanase-comprising formulation, preferably a liquid detergent formulation, more preferably a liquid laundering detergent formulation, comprising the steps of mixing in one or more steps (a) at least one mannanase at least 75% identical to SEQ ID NO: 1, preferably at least one mannanase at least 75% identical to the sequence according to positions 29-324 of SEQ ID NO: 1, and
(b) at least one detergent component selected from surfactants, builders, and hydrotropes present in amounts effective in cleaning and/or effective in maintaining the physical characteristics of the detergent.

In one embodiment, the invention relates to a method to provide a liquid mannanase-comprising formulation, comprising the steps of mixing in one or more steps in any order
(a) the enzyme preparation of the invention comprising at least one mannanase at least 75% identical to SEQ ID NO: 1, preferably at least one mannanase at least 75% identical to the sequence according to positions 29-324 of SEQ ID NO: 1, and
(b) at least one detergent component selected from surfactants, builders, and hydrotropes present in amounts effective in cleaning and/or effective in maintaining the physical characteristics of the detergent.

In one embodiment, the formulation has a pH in the range of 5-12 or 6-11, more preferably in a range selected from 6-10, 7-9, 7-12, 8-12, 8-10 and 7.5-8.5. In one embodiment, the formulation is a detergent formulation, preferably a liquid detergent formulation, more preferably a liquid laundering detergent formulation.

The laundering detergent formulation of the invention exerts wash performance which is evaluated under relevant wash conditions. The term "relevant wash/cleaning conditions" herein refers to the conditions, particularly temperature, time, cleaning mechanics, suds concentration, type of detergent and water hardness, actually used in laundry machines, or in manual washing processes. In one embodiment, wash performance herein is related towards removal of mannan-comprising stains; preferably mannan-comprising stains are selected from those comprising galactomannans and glucomannans. In one embodiment, wash performance relates to removal of stains comprising locust bean gum and/or guar gum.

In one aspect, the present invention provides a method of removing mannan comprising stains by the steps of contacting at least one mannan comprising stain with a mannanase at least 75% identical to SEQ ID NO: 1, preferably at least one mannanase at least 75% identical to the sequence according to positions 29-324 of SEQ ID NO: 1. The mannanase has mannan degrading activity at a pH in the range of 5-12 or 6-11, more preferably a pH in the range of 6-10 or 7-9 or 7-12 or 8-12 or 8-10, and most preferably at a pH in the range of 7.5-8.5. At said pH the mannanase shows wash performance on mannan comprising stains. Preferably, the method is a method of removing mannan comprising stains at temperatures 60° C., preferably in the range of about 5-60° C., preferably in the range of about 5-40° C., more preferably in the range of about 10-40° C.

In one aspect, the invention relates to a method of removing mannan comprising stains at temperatures 60° C., preferably in the range of about 5-60° C., preferably in the range of about 5-40° C., more preferably in the range of about 10-40° C., by the steps of
(a) providing a liquid formulation comprising at least one mannanase which is at least 80% identical to SEQ ID NO: 1,
(b) contacting a mannan-comprising stain with the liquid formulation of (a)

(c) let the enzyme exert its catalytic activity on the stain for a time in the range of about 10-90 minutes, preferably 20-80 minutes, more preferably 30-70 minutes, or even more preferably 40-60 minutes.

In one embodiment, the method of removing mannan comprising stains is characterized in being a method of washing which is preferably done under mechanical agitation in a laundry machine. The liquid formulation preferably is a liquid detergent formulation.

The invention relates to the use of at least one mannanase at least 75% identical to SEQ ID NO: 1, preferably at least one mannanase at least 75% identical to the sequence according to positions 29-324 of SEQ ID NO: 1, to increase washing or cleaning performance of a detergent formulation towards mannan-comprising stains, preferably stains comprising locust bean gum and/or guar gum.

In one embodiment, the detergent formulation has a pH in the range of 5-12 or 6-11, more preferably in a range selected from 6-10, 7-9, 7-12, 8-12, 8-10 and 7.5-8.5. In one embodiment, the formulation is a liquid detergent formulation, preferably a liquid laundering detergent formulation.

In one aspect, the invention relates to a formulation preferably having a pH in the range of 5-12 comprising at least one mannanase at least 75% identical to SEQ ID NO: 1, preferably a mannanase at least 75% identical to a sequence according to positions 29-324 of SEQ ID NO: 1, wherein the formulation has increased washing or cleaning performance towards mannan-comprising stains, preferably stains comprising locust bean gum and/or guar gum. Increased washing or cleaning performance towards mannan-comprising stains means increased washing or cleaning performance when compared to a formulation lacking the mannanase of the invention or lacking any mannanase.

In one embodiment, the washing or cleaning performance is increased at washing or cleaning temperatures 60° C., preferably in the range of about 5-60° C., preferably in the range of about 5-40° C., more preferably in the range of about 10-40° C.

In one aspect, the invention relates to a method of washing or cleaning, comprising the steps of
(a) providing at least one mannan-comprising stain;
(b) providing a detergent formulation according to the invention
(c) contacting the mannan-comprising stain with the detergent of (b).

In one embodiment, the textile in step (a) a textile comprising mannan-comprising stains is provided.

In one embodiment, the mannanase comprised in the detergent according to the invention removes the mannan-comprising stains from the textile (a) by (c) contacting the mannan-comprising stain with a detergent of (b).

In one aspect, the invention relates to a method of washing, comprising the steps of
(a) providing a detergent formulation according to the invention,
(b) contacting a textile comprising a mannan-comprising stain with the detergent of (a) at a washing temperature in the range of about 10-40° C.,
(c) preferably under mechanical agitation in a washing machine.

The invention relates to following embodiments:
1. A mannanase at least 75% identical to SEQ ID NO: 1, preferably a mannanase at least 75% identical to a sequence according to positions 29-324 of SEQ ID NO: 1.
2. A polynucleotide encoding the mannanase of embodiment 1, preferably a polynucleotide at least 75% identical to SEQ ID NO: 2.
3. An expression construct comprising the polynucleotide according to embodiment 2.
4. A host cell comprising the polynucleotide according to embodiment 2 or the expression construct according to embodiment 3.
5. A liquid enzyme preparation comprising a mannanase at least 75% identical to SEQ ID NO: 1, preferably a mannanase at least 75% identical to a sequence according to positions 29-324 of SEQ ID NO: 1, at least one compound stabilizing the liquid enzyme preparation as such, at least one solvent, and optionally at least one enzyme stabilizer.
6. A formulation, preferably a liquid formulation, comprising at least one mannanase at least 75% identical to the sequence according to positions 29-324 according to SEQ ID NO: 1, wherein the formulation preferably has a pH in the range of 5-12.
7. A method to provide a detergent formulation, comprising the steps of mixing in one or more steps
(a) at least one mannanase at least 75% identical to the sequence according to positions 29-324 according to SEQ ID NO: 1, preferably wherein the mannanase is provided within an enzyme preparation according to embodiment 5
and
(b) at least one component selected from surfactants, builders, and hydrotropes; all in amounts effective in cleaning and/or effective in maintaining the physical characteristics of the detergent.
8. A method of washing or cleaning, comprising the steps of
(a) providing at least one mannan-comprising stain;
(b) providing a formulation according to embodiment 6
(c) contacting the mannan-comprising stain (a) with the formulation of (b), preferably at a washing or cleaning temperature in the range of 5-60° C.
9. The method according to embodiment 8, wherein the mannan-comprising stain is provided on a textile (a); and wherein the polypeptide comprised in the detergent (b) removes the mannan-comprising stain from the textile (a).
10. Use of at least one mannanase at least 75% identical to SEQ ID NO: 1, preferably a mannanase at least 75% identical to the sequence according to positions 29-324 of SEQ ID NO: 1, to increase wash performance of a detergent formulation towards mannan-comprising stains, preferably at washing or cleaning temperatures in the range of 5-60° C.
11. The use according to embodiment 10, wherein at least one mannan-comprising stain comprises locust-bean and/or guar gum.

Example 1: Mannanase Expression

The mannanase gene was designed in silico using Geneious software. The gene was synthesized and cloned into *Bacillus* expression vector by GenScript (New Jersey, USA). The construct was received from GenScript as sequence-confirmed plasmid DNA and transformed into *Bacillus subtilis*. 5 µL of plasmid DNA, 20-200 ng/µL was added to 500 µL freshly prepared *Bacillus subtilis* competent cells and incubated at 37° C. for 3.5 hours. Cells were subsequently plated onto LB+50 ug/mL Kanamycin agar plates and grown overnight at 37° C. To confirm the mannanase in *Bacillus subtilis*, the resulting colonies were screened via colony PCR and sequencing. Prior to PCR, each colony was lysed in buffer containing 20 mM DTT and 0.5 mg/mL Proteinase K at 55° C. for 5 minutes followed by 95° C. for 6 minutes. 20 µL PCR reactions using 1 µL of lysed cells and TaKaRa Ex Taq (TaKaRa Cat #RR001)

polymerase were performed as follows: initial denaturation for 3 minutes at 98° C., 30 cycles of denaturation, annealing, and extension for 10 seconds at 95° C., 30 seconds at 55° C., and 2.5 minutes at 72° C., respectively. A final extension for 5 minutes at 72° C. completed the PCR reactions. Expression of the mannanase was done in 96-deep well plate format. Fermentations were carried out at 30° C. and under 1000 rpm of agitation, supplied via flat-blade impellers, for 20-28 hours. The final fermentation broth was centrifuged at 2500×g for 15 mins at 4° C. to obtain the cell-free supernatant. The mannanase enzyme was quantified by either SDS-PAGE or capillary electrophoresis and tested for wash performance.

Example 2: Evaluation of Mannanases in Rotawash

The mannanase enzymes can be tested for wash performance in model formulations such as ES1_C or commercially available detergent formulation such as Persil non-Bio.

| ES1_C components | | Conc. | wt % |
|---|---|---|---|
| Maranil DBS/LC | linear alkylbenzene sulfonate, anionic surfactant | | 5.5 |
| Edenor coco fatty acid | $C_{12}$-$C_{18}$ coco fatty acid | | 2.4 |
| Lutensol AO7 | alkyl polyethyleneglycol ether, non-ionic surfactant | | 5.5 |
| Texapon N70 | sodium laureth sulfate 2EO, anionic surfactant | | 5.5 |
| 1,2 propylene glycol | | | 6.0 |
| $C_2H_5OH$ | | | 2.0 |
| KOH | | | 2.2 |
| Citrate | | | 3.0 |
| Mannanase | | according to Table Ex2 | |
| pH | | | 8-8.5 |
| $H_2O$ | up to 100% | | |

The following mannanases were tested in Persil non-Bio (pH 7.2) detergent at 40° C. washing temperature:
Man01: sequence according to positions 29-324 of SEQ ID NO: 1
Man02: mannanase according to SEQ ID NO: 3
CFT C-S-43/guar gum stain monitors or CFT C-S-73/locust bean gum stain monitors (CFT, Vlaardingen, NL) were washed together with cotton ballast fabric and steel balls in wash liquor using Persil non-Bio in the Rotawash (Rotawash M228, SDL Atlas Inc., USA) under the following washing conditions:

| | |
|---|---|
| Washing liquor | 500 ml |
| # Steel balls | 20 |
| Washing time/temperature | 40 min at 40° C. |
| Dosage Mannanase | According to Table Ex2 |
| Dosage Persil non-Bio | 3.5 g/L |
| Washing cycles | 1 |
| Water hardness | 2.7 mmol/L |
| Ballast fabric | 4 g cotton fabric 283 |
| Soiled swatches | 2 × 0.4 g C-S-43 or 2 × 0.4 g C-S-73 |

After the washing, the fabrics were rinsed and dried in the air. The wash performance for the single stains was determined by measuring the average color intensity of the soiled fabric after wash with a flatbed color image scanner from EPSON (Expression 11000XL). In general, the higher the average intensity value, the better the performance. The results are also outlined below in Table Ex2.

TABLE Ex2a

Man01 wash performance at 40° C. on guar gum stain (C-S-43) in Persil non-Bio detergent; values in average intensity (RGB)

| Dose | values in average intensity (RGB) | |
|---|---|---|
| ppm | Man02 | Man01 |
| 0 | 0.62 | 0.62 |
| 0.01 | 0.68 | 0.70 |
| 0.05 | 0.71 | 0.74 |
| 0.1 | 0.71 | 0.76 |

TABLE Ex2b

Man01 wash performance at 40° C. on locust bean gum stain (C-S-73) in Persil non-Bio detergent; values in average intensity (RGB)

| Dose | values in average intensity (RGB) | |
|---|---|---|
| ppm | Man02 | Man01 |
| 0 | 0.67 | 0.67 |
| 0.05 | 0.78 | 0.80 |
| 0.1 | 0.78 | 0.82 |

The invention claimed is:

1. An amino acid sequence having at least 90% identity to positions 29-324 of SEQ ID NO: 1, wherein percent identity is calculated over the full length of the amino acid sequence and the full length of positions 29-324 of SEQ ID NO: 1.

2. A polynucleotide encoding the mannanase of claim 1.

3. An expression construct comprising the polynucleotide according to claim 2.

4. A host cell comprising the polynucleotide according to claim 2.

5. The amino acid sequence of claim 1, wherein the amino acid sequence has at least 95% identity to positions 29-324 of SEQ ID NO: 1.

6. The amino acid sequence of claim 1, wherein the amino acid sequence comprises at least 98% identity to positions 29-324 SEQ ID NO: 1.

7. An amino acid sequence consisting of positions 29-324 of SEQ ID NO: 1.

* * * * *

SEQUENCE LISTING

<160> NUMBER OF SEQ ID NOS: 3

<210> SEQ ID NO 1
<211> LENGTH: 324
<212> TYPE: PRT
<213> ORGANISM: Artificial Sequence
<220> FEATURE:
<223> OTHER INFORMATION: Synthetic
<220> FEATURE:
<221> NAME/KEY: SIGNAL
<222> LOCATION: (1)..(28)
<223> OTHER INFORMATION: Positions 1 to 28 represent an added signal
      sequence, the mature protein starts with amino acid at position
      29.

<400> SEQUENCE: 1

Met Lys Lys Ile Val Ser Ile Leu Phe Met Phe Gly Leu Val Met Gly

```
  1               5                 10                15
Phe Ser Gln Phe Gln Pro Ser Thr Val Phe Ala Ala Thr Gly Phe
                20                25                30

Tyr Val Asn Gly Asn Thr Leu Tyr Asp Ala Thr Gly Ser Pro Phe Val
            35                40                45

Met Arg Gly Ile Asn His Ala His Ser Trp Phe Lys Asp Asp Ser Ser
 50                    55                60

Thr Ala Ile Pro Ala Ile Ala Lys Thr Gly Ala Asn Thr Ile Arg Ile
65                  70                75                 80

Val Leu Ser Asp Gly Ser Gln Tyr Thr Lys Asp Asp Ile Asn Thr Val
                85                90                95

Lys Ser Leu Ile Ser Leu Ala Glu Lys Asn Asn Leu Ile Ala Ile Leu
            100               105               110

Glu Val His Asp Ala Thr Gly Asn Asp Ala Val Ser Ser Leu Asn Asp
            115               120               125

Ala Val Ser Tyr Trp Ile Ser Ile Lys Glu Ala Leu Ile Gly Lys Glu
            130               135               140

Asp Arg Val Leu Ile Asn Ile Ala Asn Glu Trp Tyr Gly Thr Trp Asp
145                 150               155                160

Gly Ala Ser Trp Ala Ser Gly Tyr Lys Gln Ala Ile Pro Lys Leu Arg
                165               170               175

Asp Ala Gly Leu Ser His Thr Leu Ile Val Asp Ser Ala Gly Trp Gly
            180               185               190

Gln Tyr Pro Glu Ser Ile His Gln Tyr Gly Lys Asp Val Phe Asn Ala
            195               200               205

Asp Pro Leu Lys Asn Thr Met Phe Ser Ile His Met Tyr Glu Tyr Ala
210                 215               220

Gly Gly Asp Ala Ser Thr Ile Lys Ser Asn Ile Asp Gly Val Leu Asn
225                 230               235                240

Gln Asp Leu Ala Leu Ile Ile Gly Glu Phe Gly His Lys His Thr Asn
                245               250               255

Gly Asp Val Asp Glu Glu Thr Ile Met Ser Tyr Ser Gln Gln Lys Asn
            260               265               270

Val Gly Trp Leu Ala Trp Ser Trp Lys Gly Asn Gly Pro Glu Trp Ser
            275               280               285

Tyr Leu Asp Leu Ser Asn Asp Trp Ala Gly Asp Asn Leu Thr Ser Trp
            290               295               300

Gly Asn Thr Ile Val Asn Gly Ala Asn Gly Leu Lys Ala Thr Ser Lys
305                 310               315                320

Ile Ser Pro Val

<210> SEQ ID NO 2
<211> LENGTH: 975
<212> TYPE: DNA
<213> ORGANISM: Artificial Sequence
<220> FEATURE:
<223> OTHER INFORMATION: Synthetic - CDS encoding the protein given by
      SEQ ID: 1

<400> SEQUENCE: 2
atgaaaaaaa tcgtgtctat cctatttatg ttcggtttgg ttatgggttt cagccagttt     60
cagccatcaa ccgttttttgc ggctgcaact ggcttttatg taaacggaaa cactctgtac   120
gatgcaacag gtagcccgtt tgttatgagg ggaattaacc atgctcattc ttggtttaaa   180
gatgattctt ctacagcaat ccctgctata gcgaaaacag gggctaatac tattagaatc   240
```

```
gtcctatctg atggaagcca gtatacaaaa gatgatatta atacagtaaa aagtcttata     300
tccttagctg agaagaataa ccttattgct attttagagg tgcatgatgc cacaggaaac     360
gatgctgtta gctcgttaaa cgatgctgtt agctattgga ttagtattaa agaggctctt     420
attggaaaag aagatagggt cttaattaat attgccaatg aatggtatgg tacttgggat     480
ggtgcaagtt gggcaagtgg ctataaacag ctattccaa agttaagaga tgctggactc      540
agccatacat taattgtaga ttccgcaggt tggggacaat atccagagtc tatccatcaa     600
tatggtaaag atgtatttaa tgctgatcca ctaaaaaata caatgttttc tattcatatg     660
tatgaatatg ctggggggga tgcttccact attaaatcaa atattgacgg agtactgaat     720
caggatcttg cattaattat tggtgaattt ggacataaac atacgaatgg agatgttgat     780
gaggaaacaa ttatgagtta ctcacagcag aagaatgttg gttggttagc ttggtcttgg     840
aaaggtaatg cccccgagtg gagttattta gacttatcaa atgattgggc tggagataat     900
ttaacctcgt ggggtaatac aattgtaaat ggagctaatg gtttaaaagc tacttctaaa     960
ataagtccag tatag                                                     975
```

<210> SEQ ID NO 3
<211> LENGTH: 297
<212> TYPE: PRT
<213> ORGANISM: Artificial Sequence
<220> FEATURE:
<223> OTHER INFORMATION: Synthetic

<400> SEQUENCE: 3

```
Ala Asn Ser Gly Phe Tyr Val Ser Gly Thr Thr Leu Tyr Asp Ala Asn
1               5                   10                  15

Gly Asn Pro Phe Val Met Arg Gly Ile Asn His Gly His Ala Trp Tyr
            20                  25                  30

Lys Asp Gln Ala Thr Thr Ala Ile Glu Gly Ile Ala Asn Thr Gly Ala
        35                  40                  45

Asn Thr Val Arg Ile Val Leu Ser Asp Gly Gly Gln Trp Thr Lys Asp
    50                  55                  60

Asp Ile His Thr Val Arg Asn Leu Ile Ser Leu Ala Glu Asp Asn His
65                  70                  75                  80

Leu Val Ala Val Leu Glu Val His Asp Ala Thr Gly Tyr Asp Ser Ile
                85                  90                  95

Ala Ser Leu Asn Arg Ala Val Asp Tyr Trp Ile Glu Met Arg Ser Ala
            100                 105                 110

Leu Ile Gly Lys Glu Asp Thr Val Ile Ile Asn Ile Ala Asn Glu Trp
        115                 120                 125

Phe Gly Ser Trp Glu Gly Asp Ala Trp Ala Asp Gly Tyr Lys Gln Ala
    130                 135                 140

Ile Pro Arg Leu Arg Asn Ala Gly Leu Asn His Thr Leu Met Val Asp
145                 150                 155                 160

Ala Ala Gly Trp Gly Gln Phe Pro Gln Ser Ile His Asp Tyr Gly Arg
                165                 170                 175

Glu Val Phe Asn Ala Asp Pro Gln Arg Asn Thr Met Phe Ser Ile His
            180                 185                 190

Met Tyr Glu Tyr Ala Gly Gly Asn Ala Ser Gln Val Arg Thr Asn Ile
        195                 200                 205

Asp Arg Val Leu Asn Gln Asp Leu Ala Leu Val Ile Gly Glu Phe Gly
    210                 215                 220
```

```
His Arg His Thr Asn Gly Asp Val Asp Glu Ala Thr Ile Met Ser Tyr
225                 230                 235                 240

Ser Glu Gln Arg Gly Val Gly Trp Leu Ala Trp Ser Trp Lys Gly Asn
            245                 250                 255

Gly Pro Glu Trp Glu Tyr Leu Asp Leu Ser Asn Asp Trp Ala Gly Asn
            260                 265                 270

Asn Leu Thr Ala Trp Gly Asn Thr Ile Val Asn Gly Pro Tyr Gly Leu
        275                 280                 285

Arg Glu Thr Ser Arg Leu Ser Thr Val
    290                 295
```